G. J. CORPORON.
SHOCK ABSORBER.
APPLICATION FILED JUNE 21, 1921.
1,437,291.
Patented Nov. 28, 1922.
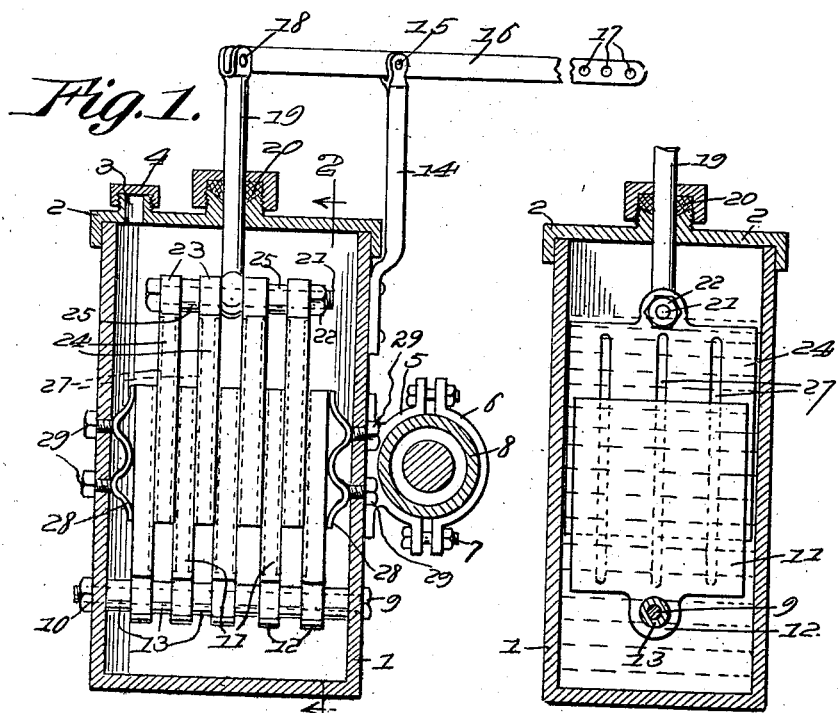
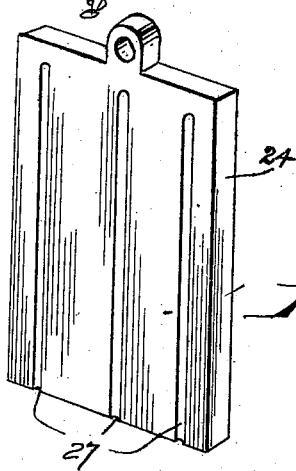
Inventor
G. J. Corporon,
By William W. Deane,
his Attorney Patented Nov. 28, 1922.

1,437,291

UNITED STATES PATENT OFFICE.

GEORGE JOSEPH CORPORON, OF AMESBURY, MASSACHUSETTS.

SHOCK ABSORBER.

Application filed June 21, 1921. Serial No. 479,263.

*To all whom it may concern:*

Be it known that I, GEORGE JOSEPH CORPORON, citizen of the United States, residing at Amesbury, in the county of Essex and State of Massachusetts, have invented certain new and useful Improvements in Shock Absorbers, of which the following is a specification, reference being had therein to the accompanying drawing.

This invention relates to improvements in shock absorbers particularly designed for use in connection with motor vehicles but not limited to this specific application.

The primary object of the invention is to furnish an improved shock absorber utilizing the properties of rubbing plates and a liquid for absorbing shocks.

Another object of the invention is to provide a shock absorber of this type provided with means for adjusting the rubbing action of the plates so that the plates will bear with more or less friction against adjacent plates.

Another object of the invention is to furnish a rubbing plate shock absorber in which the plates are provided with grooves which permit the passage of the shock absorbing fluid between the plates.

With the foregoing objects outlined, and with other objects in view which will appear as the description proceeds, the invention consists in the novel features hereinafter described in detail, illustrated in the accompanying drawing and more particularly pointed out in the appended claims.

Referring to the drawing:

Figure 1 is a longitudinal sectional view of the improved shock absorber.

Fig. 2 is a transverse sectional view of the same taken on line 2—2 of Fig. 1.

Fig. 3 is a perspective view of one of the plates employed in the absorber.

In the drawing, 1 designates a casing or receptacle having a cover 2 provided with a filling aperture 3 closed by a cap 4. The casing is provided on one side with a half collar 5 designed to cooperate with a second half collar 6 and fastening means 7 for securing the casing to the axle 8 of a vehicle.

A bolt 9 connects opposite walls of the casing and extends through the lower portion of the interior of the casing, and is provided at one end with a nut 10 to permit its attachment and detachment from the casing. Mounted on the bolt 9 is a series of plates 11 each having an apertured ear 12 at its lower end through which the bolt passes. Spacing collars 13 are mounted on the bolt to space the plates apart.

The casing is preferably provided with a vertical post 14 having a bifurcated upper end 15 which carries a pivotally mounted lever 16. One end of the lever is provided with a plurality of aperture 17 to permit the lever to be adjustably connected to a vehicle spring (not shown). The other end of the lever is connected by a pin 18 to the bifurcated upper end of a reciprocating rod 19. This rod passes through a packing gland 20 and its lower end is connected to a bolt 21 having a nut 22 at one of its ends. This bolt passes through ears 23 in the upper ends of sliding plates 24 which operate in the spaces between the plates 11. The bolt 21 is provided with spacing collars 25 to space the plates 24 apart.

One of the rubbing plates is illustrated in Fig. 3 and it consists of a substantially rectangular flat member provided on its opposite sides with oil channels 27. Leaf springs 28 bear against the outer sides of the outer plates 11 and extension screws 29 are provided for the purpose of adjusting these springs.

In operation the casing 1 is substantially filled with oil or a similar liquid and when a shock occurs the plates 24 and 11 move relatively to each other. This causes oil to pass through the channels 27, and the oil passing through these restricted passageways functions to absorb the shock.

It is not desired to limit the invention to this specific purpose or specific form, but the detail description of this special apparatus is for the purpose of presenting a clear and accurate description of one practical application.

It is to be understood that the cover 2 may be detached when desired and that all of the parts may be renewed or repaired with little difficulty as these parts are all detachable from the apparatus.

From the foregoing, I believe that the construction and arrangement of parts may be readily understood by those skilled in the art and I am aware that various changes may be made in the construction shown without departing from the spirit of the invention as expressed in the following claims.

What I claim and desire to secure by Letters-Patent is:

1. A shock absorber comprising a casing adapted to contain a liquid, a series of relatively stationary spaced plates mounted in said casing, a series of reciprocating plates arranged between the other plates and adapted to displace liquid between said stationary plates, an actuating member engaging the movable plates, and means for constantly forcing said plates toward one another.

2. A shock absorber comprising a casing adapted to contain a liquid, a series of relatively fixed spaced plates mounted in said casing, a series of movable plates arranged between the other plates, an actuating member connected to the movable plates, and means for yieldingly and constantly forcing said plates toward one another.

3. A shock absorber of the kind defined by claim 2 in which the first mentioned plates are provided with channels to permit the passage of the liquid within the casing.

4. A shock absorber of the kind defined by claim 2 in which the second mentioned plates are provided with channels to permit the passage of the liquid.

5. A shock absorber of the kind defined by claim 2 in which the plates are provided with channels to permit the passage of liquid between the plates.

6. A shock absorber of the kind defined by claim 2 in which the means for forcing the plates together includes leaf springs and adjusting screws.

7. A shock absorber of the kind defined by claim 2 in which the casing is provided with a bracket for securing the same to an axle, a post connected to the casing, and a lever pivotally mounted on the post and connected to the operating member of the movable plates.

8. A shock absorber comprising a casing having a removable cap and adapted to contain a liquid, a bolt extending through said casing from one side wall to an opposite side wall, a series of fixed plates connected to said bolt, a rod slidably mounted in the cover of said casing, a series of spaced movable plates carried by said rod and arranged between the fixed plates, and adjustable resilient means for forcing said plates together.

9. A shock absorber of the kind defined by claim 8 in which the plates are provided with channels to permit the passage of liquid between the same.

10. A shock absorber of the kind defined by claim 8 in which the means for forcing the plates together includes leaf springs and adjusting screws.

In testimony whereof I hereunto affix my signature in the presence of two witnesses.

GEORGE JOSEPH CORPORON. [L. S.]

Witnesses:
CARL C. CHIPMAN,
JOHN GIBBONS.